United States Patent
Grimm et al.

(10) Patent No.: US 8,807,646 B2
(45) Date of Patent: Aug. 19, 2014

(54) ASSEMBLY FOR AN OPENABLE SLIDING ROOF

(75) Inventors: Rainer Grimm, Frankfurt (DE); Juergen Schrader, Weil im Schoenbruch (DE); Achim Demmer, Magstadt (DE)

(73) Assignee: Roof Systems Germany GmbH (DE)

(*) Notice: Subject to any disclaimer, the term of this patent is extended or adjusted under 35 U.S.C. 154(b) by 10 days.

(21) Appl. No.: 13/449,635

(22) Filed: Apr. 18, 2012

(65) Prior Publication Data

US 2013/0099528 A1    Apr. 25, 2013

(30) Foreign Application Priority Data

Apr. 19, 2011 (DE) .......................... 10 2011 018 151

(51) Int. Cl.
*B60J 7/185* (2006.01)
*B60J 7/047* (2006.01)

(52) U.S. Cl.
USPC ...................................... 296/224; 296/216.03

(58) Field of Classification Search
USPC ........................................... 296/216.01–224
See application file for complete search history.

(56) References Cited

U.S. PATENT DOCUMENTS

| | | | | |
|---|---|---|---|---|
| 4,609,223 A | * | 9/1986 | Haig | 296/222 |
| 4,678,228 A | | 7/1987 | Boots | |
| 5,026,113 A | * | 6/1991 | DiCarlo et al. | 296/221 |
| 5,632,657 A | * | 5/1997 | Henderson | 440/6 |

FOREIGN PATENT DOCUMENTS

| | | |
|---|---|---|
| DE | 3424332 A1 | 1/1986 |
| DE | 102009052451 A1 | 5/2011 |
| EP | 0187398 | 7/1986 |
| JP | H03227721 A | 10/1991 |
| WO | 9002665 | 3/1990 |

OTHER PUBLICATIONS

Preliminary Search Report dated Jan. 8, 2013.
English Translation to Abstract JPH03227721.
Dutch Search Report for Application No. 2008557 dated Apr. 29, 2014.

* cited by examiner

*Primary Examiner* — Dennis H Pedder
(74) *Attorney, Agent, or Firm* — Cantor Colburn LLP

(57) ABSTRACT

In one embodiment, an assembly for an openable sliding roof having a cover for selectively exposing and closing a roof opening is provided, the assembly having: at least one lever for raising and lowering the cover, the at least one lever being pivotally mounted to the cover; and a height adjusting mechanism for repositioning the lever with respect to the cover, the height adjusting mechanism having an eccentric coupling the lever to the cover.

15 Claims, 6 Drawing Sheets

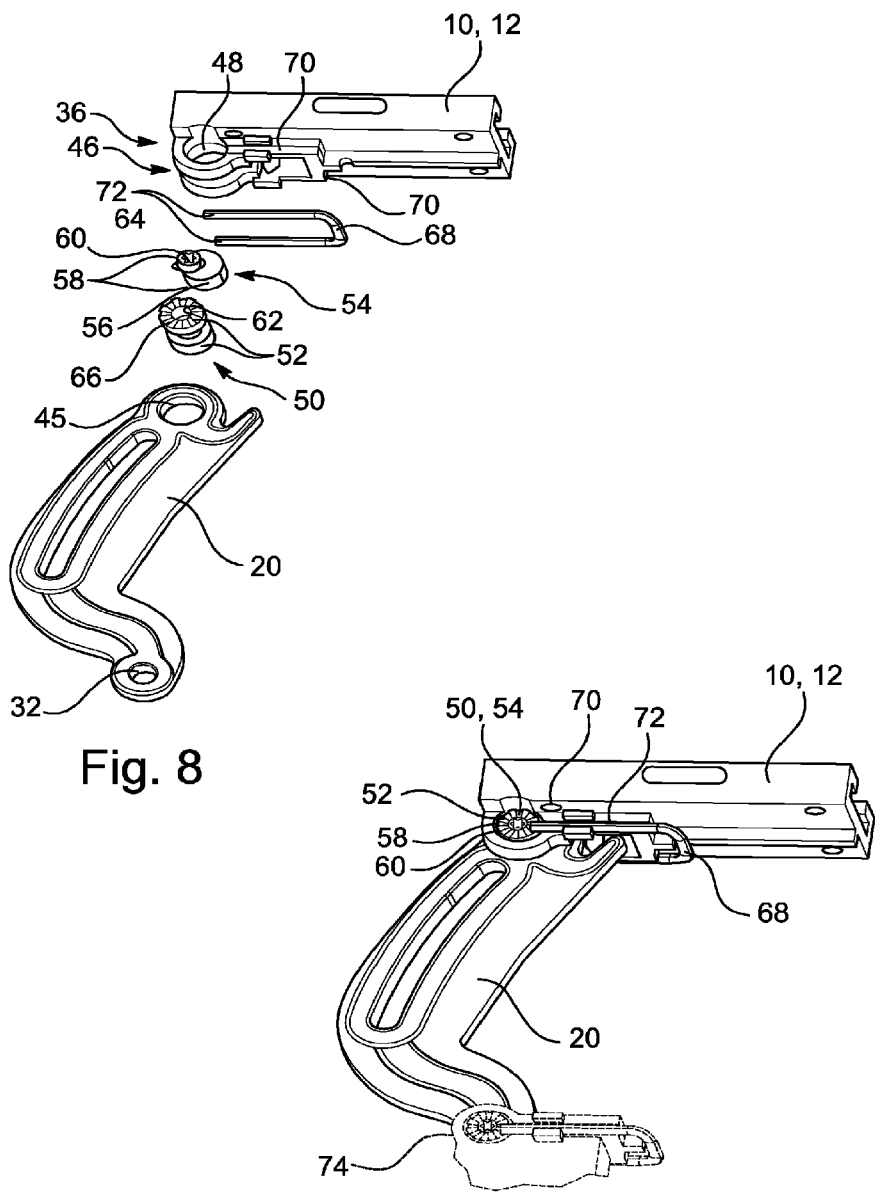

ASSEMBLY FOR AN OPENABLE SLIDING ROOF

CROSS REFERENCE TO RELATED APPLICATIONS

This application claims priority under 35 U.S.C. §119 to the following German Patent Application No. 10 2011 018 151.2 filed Apr. 19, 2011, the contents of which are incorporated herein by reference thereto.

BACKGROUND

This invention relates to an assembly for an openable sliding roof with a cover for selectively exposing and closing a roof opening, wherein the cover can be raised via at least one lever, and wherein the lever is pivotally mounted on the cover side and on the vehicle side.

Vehicle roofs are known from the prior art, which provide openable sliding roofs, which also comprise tilt/slide sunroofs or panoramic roofs, having a cover which can be shifted between a closed position, in which it closes the opening in the vehicle roof, via various intermediate positions (for example a venting position) into an open position in which the opening in the vehicle roof substantially is exposed. On the vehicle side, two guide rails usually are provided, which extend parallel to the direction of travel substantially on the left and on the right hand side of the opening. In these rails, a shifting and raising mechanism each is provided, to which the cover is attached. The raising mechanism includes at least one raising lever with which the cover is mounted on a movable carriage. By swiveling the raising lever, the inclination of the cover can be adjusted or the entire cover can be lifted. At each lateral edge, a raising lever usually is provided, which engages the cover.

For optical, but also for aerodynamic reasons it is desired that cover and vehicle roof lie in one plane in the closed position of the cover, i.e. there is no step between cover and vehicle roof. This requires a manufacture of the assembly within close manufacturing tolerances and a very accurate installation of the assembly. Alternatively, the exact height can be adjusted after installation of the sliding roof. However, the assemblies known so far only have insufficient or laborious adjustment possibilities for height adaptation of the cover.

Accordingly it is desirable to provide an assembly for an openable sliding roof, which ensures a better height adjustment of the cover.

SUMMARY OF THE INVENTION

For the solution of this object, a height adjusting mechanism for the cover is provided in an assembly for an openable sliding roof with a cover for selectively exposing and closing a roof opening, which can be raised via at least one lever, wherein the lever is pivotally mounted on the cover side and on the vehicle side, which mechanism includes an eccentric via which the lever is fixed. Such height adjusting mechanism provides for a fast and easy adaptation of the height of the cover relative to the vehicle. In addition, the eccentric ensures a very exact adjustment of the height of the cover, without complicated modifications being required or without having to release the cover-side or vehicle-side attachment of the lever.

Preferably, the eccentric is rotatably and hence adjustably accommodated in a cover- or vehicle-side bearing for height adjustment. The position of the lever relative to the cover or to the vehicle is varied by rotation of the eccentric. After adjustment of the eccentric, a releasable locking mechanism can block a rotation of the eccentric relative to the bearing so that after adjustment of the eccentric its position relative to the bearing is fixed. In addition, a counter bearing cooperates with the eccentric, and assumes a different position relative to the bearing due to the adjusted eccentricity providing for a height adjustment.

This locking mechanism can be a latching connection.

The locking mechanism can block the eccentric relative to the bearing in various rotary positions. A stepless adjustment or fixation of the eccentric involves a relatively high construction effort. A latching connection provides both for an easy blocking of the eccentric and, with a correspondingly narrow raster, also for a sufficient accuracy of the height adaptation of the cover.

The eccentric may include lateral receptacles or protrusions for engagement of a locking member mounted on the side of the cover, of the lever or of the vehicle.

Preferably, an end-face toothing can be provided.

According to one embodiment, the locking member is laterally mounted to be shifted between an adjusting position and a locking position. Locking the eccentric is effected on the end faces of the eccentric and not on a radial circumferential surface. In this embodiment, the receptacle for the eccentric and the bearing can be formed round, which provides for utilizing the previously used components and constructions.

The locking member for example is U-shaped and rests against two axially opposite portions of the eccentric. In this embodiment, the locking member for example is a U-shaped clip which can be shifted along the assembly. This provides for an easy assembly and disassembly of the locking member and thus for easily releasing or blocking the eccentric, whereby a fast and easy height adjustment can be effected. Another advantage of such locking member consists in that the same safely prevents an axial shifting of the eccentric, i.e. also slipping out of the eccentric from the bearing and counter bearing.

The eccentric can include an axle which is non-rotatably held on the vehicle side, on the lever side or on the cover side.

The eccentric also can have a multipart configuration, wherein for example additional components can be used for mounting the eccentric.

Mounting can be effected by a cylindrical sleeve in which the axle of the eccentric is held, which is eccentric relative to the sleeve, preferably in that on two opposite axial end faces of the axle one sleeve each is provided. The axle and the sleeve are non-rotatably connected with each other, in particular by positive engagement.

Axle and sleeve for example can be parts axially insertable into each other, wherein on the axle or the sleeve radially protruding protrusions are provided, which can engage in corresponding grooves.

The eccentric either can be provided between lever and cover or between the lever and a vehicle-mounted part.

In one embodiment, an assembly for an openable sliding roof having a cover for selectively exposing and closing a roof opening is provided, the assembly having: at least one lever for raising and lowering the cover, the at least one lever being pivotally mounted to the cover; and a height adjusting mechanism for repositioning the lever with respect to the cover, the height adjusting mechanism having an eccentric coupling the lever to the cover.

In another embodiment, an assembly for an openable sliding roof having a cover for selectively exposing and closing a roof opening is provided. The assembly having: at least one lever for raising and lowering the cover, the at least one lever being pivotally mounted to the cover and a vehicle fixture; and a height adjusting mechanism for repositioning the lever, the height adjusting mechanism having an eccentric coupling the lever to the vehicle fixture.

BRIEF DESCRIPTION OF THE DRAWINGS

Further advantages and features can be taken from the following description in conjunction with the attached drawings, in which:

FIG. 8 shows an exploded view of the assembly according to the invention, and FIG. 9 shows the assembly of FIG. 8 in the assembled condition.

DETAILED DESCRIPTION

Figure 1:
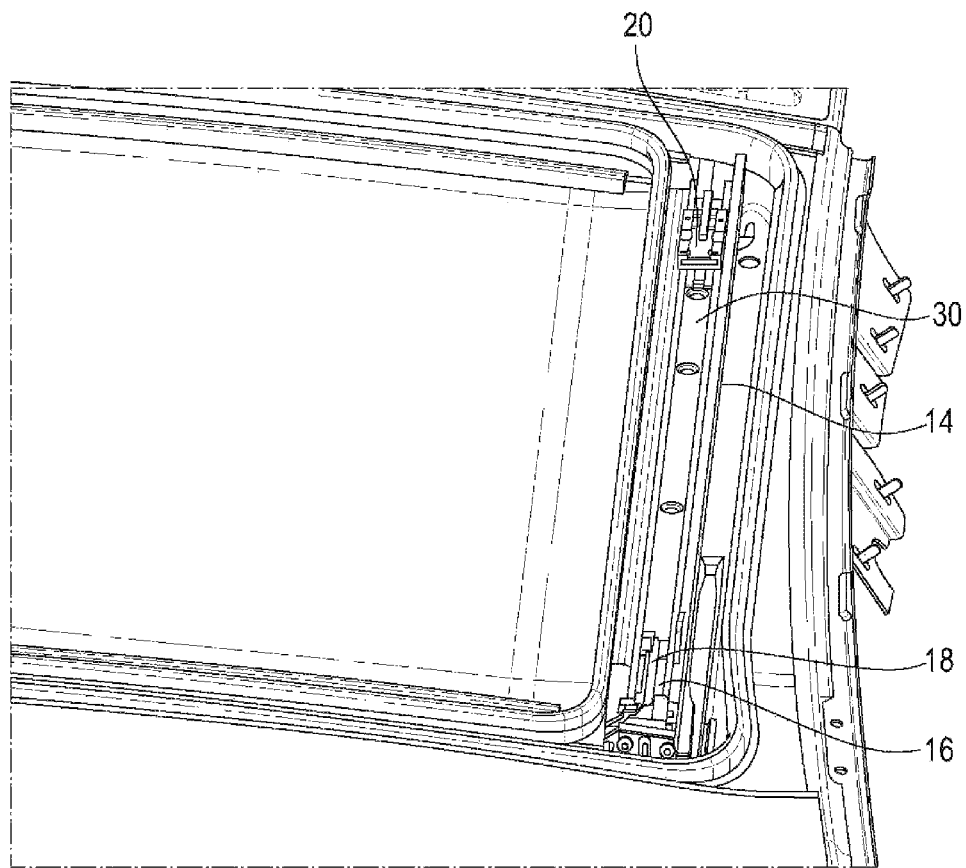
FIG. 1 shows a perspective top view of a sliding roof system with an assembly according to the invention, wherein the cover and the cover holder are removed.

With reference to FIGS. 1 to 7 the configuration of a sliding roof system will be described below with respect to a lever 20 located at the rear for raising the sliding roof.

The sliding roof system serves to shift a cover 10 (see FIGS. 6 and 7) from a closed position, in which it closes an opening in a vehicle roof, via various intermediate positions into an open position, in which the opening in the vehicle roof substantially is completely exposed. The cover 10 here includes a cover holder 12 which via various components of a raising mechanism is shiftably coupled with a vehicle-side guide rail 14 (see FIGS. 1 and 6).

The cover holder 12 can be formed integrally with the cover 10 or also be a separate component which is connected with the cover 10. In practice, usually two guide rails 14 and correspondingly two cover holders 12 are used, which both extend substantially parallel to the direction of travel of the vehicle and substantially on the left and on the right side of the cover 10 and the roof opening, respectively.

For adjusting the cover holder 12 and hence the cover 10 a carriage 16 is provided, which is shiftably mounted in the guide rail 14 and can be shifted by a drive motor (not shown) along the guide rail 14 via a compression-rigidly guided drive cable.

Figure 2:
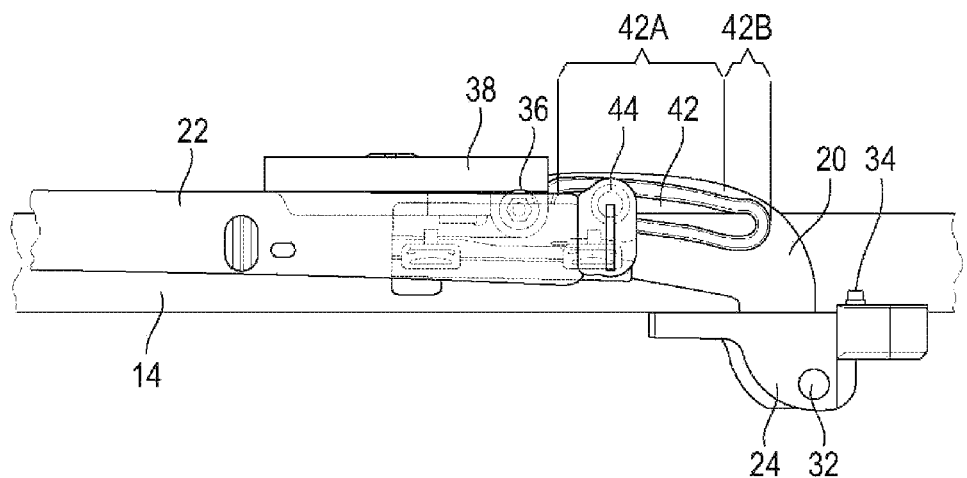
FIG. 2 shows a schematic side view of the sliding roof system in the region of the raising lever of the sliding roof system in a condition with closed cover.

In the starting position or closed position of the cover 10, which is shown in FIG. 2, the carriage 16 is in a front position (relative to the longitudinal direction of the vehicle), in which it ensures that both a guide element 18 located at the front (see FIG. 1) and a lever 20 located at the rear are in a lowered position or starting position.

When the carriage 16 is shifted to the rear proceeding from the front position, the lever 20 is swiveled to the rear via a raising rod 22.

At a certain point of the movement to the rear, namely when the lever 20 is fully raised to the outside, the carriage 16 is detached from the raising rod 22, wherein at the same time the front end of the raising rod 22 is stationarily fixed in the guide rail 14 by a latch mechanism. Subsequently, the carriage 16 is moved further to the rear, wherein the guide element 18 located at the front is carried along. The cover holder 12 thereby is shifted relative to the upper end of the lever 20, so that in a position with completely open cover the guide element 18 located at the front is disposed relatively close to the lever 20 located at the rear.

Figure 7:
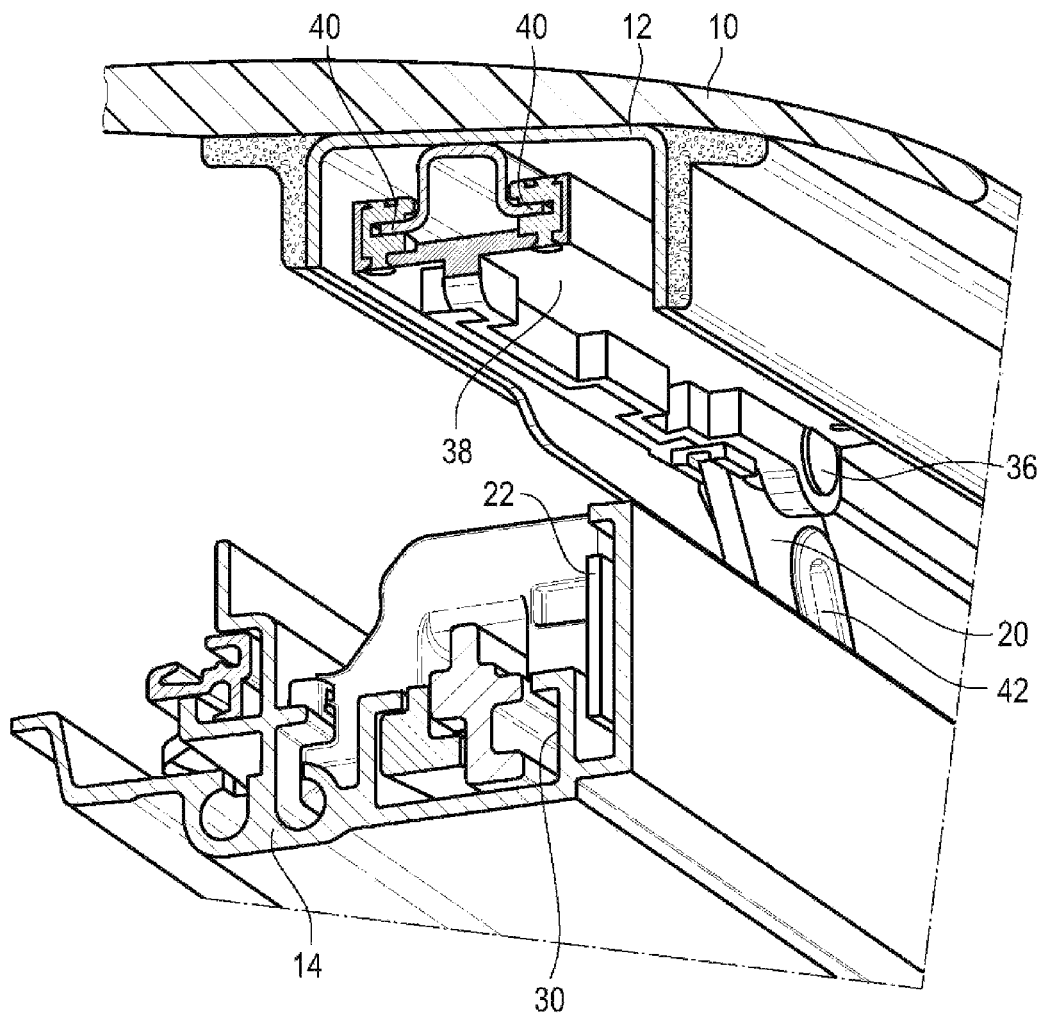
FIG. 7 shows a sectional view of the sliding roof system according to the invention in a condition with the cover fully raised.

In this sliding roof system, the guide rail 14 is designed much more compact in transverse direction, since the carriage 16 and the lever 20 are arranged in the same guideway 30 (see in particular FIG. 1). The lever 20 is mounted on the guide rail 14 or any other vehicle fixture such bearing block 24 or guide rail 14 by a swivel bearing 32 or swivel bearing 36 whose swivel axis extends approximately vertical to the longitudinal direction of the guide rail 14 and is formed in the bearing block 24. The same is mounted on the guide rail 14 such that the swivel axis of the swivel bearing 32 lies below the plane of the guide rail 14. For fixing the bearing block 24 on the guide rail 14 connecting pins 34 are provided (see FIG. 2). As shown in FIG. 7, the raising rod 22 is located laterally beside the guideway 30.

The lever 20 is L-shaped (see FIG. 2), wherein with lying lever 20 the short leg of the L points downwards and is connected with the bearing block 24 by means of the swivel bearing 32. In the starting position, the longer arm of the L arranged above the swivel bearing 32 is arranged substantially horizontally and parallel to the guide rail 14. At its free end facing away from the swivel bearing 32, the lever 20 is connected with a slider 38 by a swivel bearing 36, which slider is shiftably accommodated in a sliding guideway 40 which is mounted on the cover holder 12. In the lever 20 a coulisse 42 is formed, which is arranged as a continuous guiding slot in the longer arm of the L-shaped lever 20. The coulisse consists of a longer, substantially uniformly curved portion 42A, whose center of curvature lies on the side of the guide rail, and of a shorter portion 42B which is comparatively short and is offset relative to the portion 42A in the opposite direction.

A sliding block 44, which is arranged at the end of the raising rod 22 associated to the raising lever 20, engages in the coulisse 42. This end of the raising rod 22 is provided with a sliding guideway 49, which shiftably engages in suitable guiding formations of the guide rail 14, for example engages around both sides of a horizontal guiding web of the guide rail. In this way, the end of the raising rod 22 associated to the lever 20 is reliably guided in vertical direction.

Figure 3:
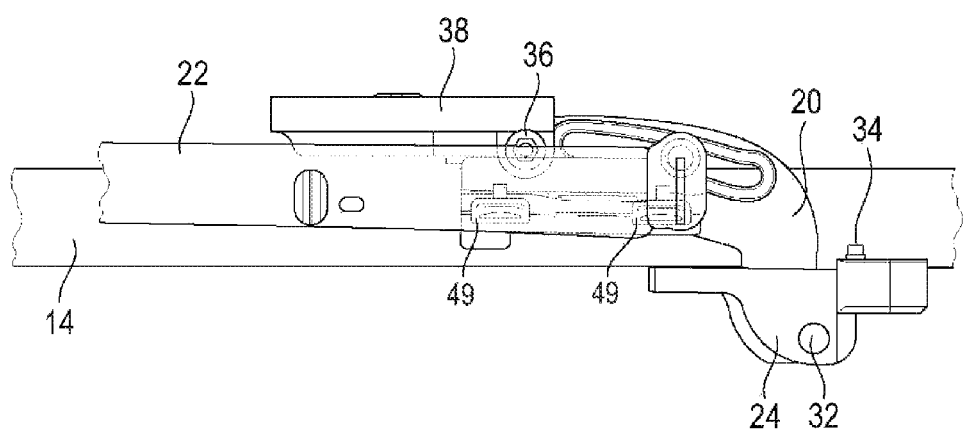
FIG. 3 shows a schematic side view of the sliding roof system in the region of the raising lever in a condition slightly raised.
Figure 4:
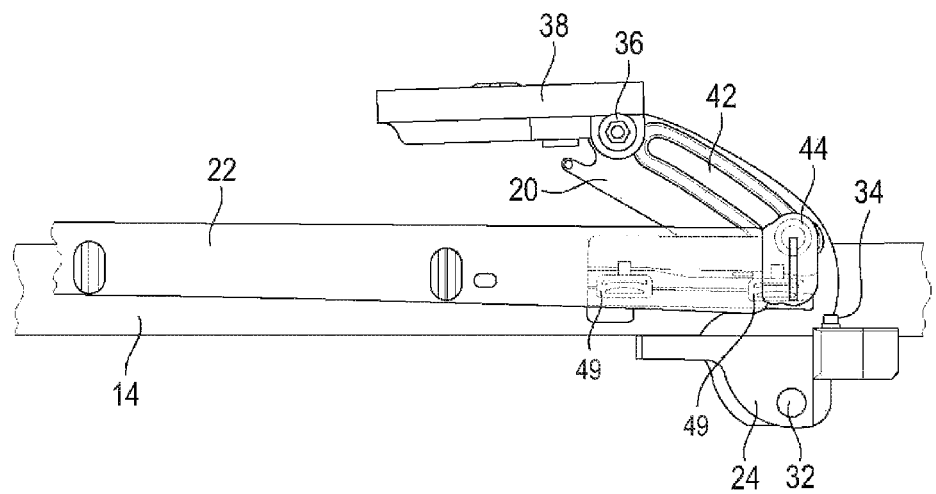
FIG. 4 shows a schematic side view of the sliding roof system in the region of the raising lever in a condition raised even further.
Figure 5:
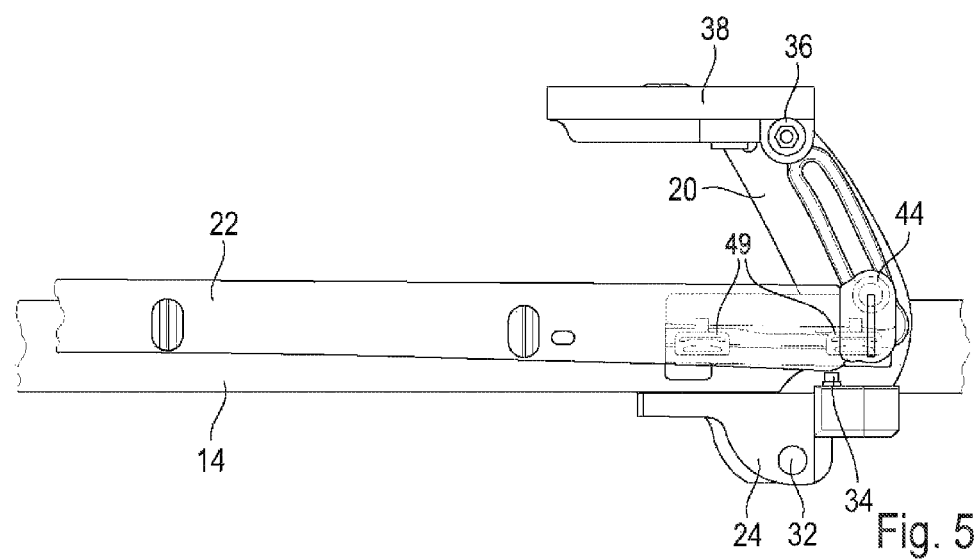
FIG. 5 shows a schematic side view of the sliding roof system in the region of the raising lever in a condition fully raised.
Figure 6:
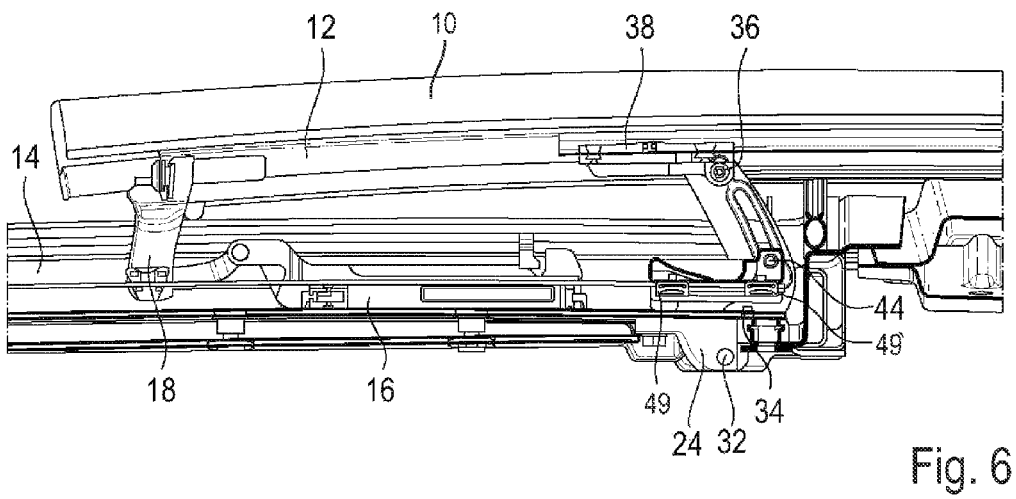
FIG. 6 shows a schematic side view of the sliding roof system in the region of the raising lever in a condition with the cover fully raised.

In the starting position, i.e. when the cover 10 is in the closed position in which it closes the opening in the vehicle roof, the lever 20 is in the position shown in FIG. 2, in which its longer arm extends substantially parallel to the guide rail 14. The end of the lever 20 provided with the swivel bearing 36, which is associated to the cover 10, is located closer to the carriage 16 than the swivel bearing 32. In other words, the longer arm of the lever 20 points forwards to the carriage 16. When the carriage is shifted to the rear proceeding from its starting position, it carries along the raising rod 22, which with its sliding block 44 is shifted to the rear in the coulisse 42. Due to the curvature of the coulisse 42, the lever 20 is swiveled about the swivel bearing 32, whereby the swivel bearing 36 is swiveled to the top and to the rear about the swivel bearing 32 on a circular path. FIG. 3 shows a condition with slightly lifted slider 38, and FIG. 4 shows a condition in which the sliding block 44 is maximally shifted to the rear in the coulisse 42. When the raising rod 22 is shifted to the rear beyond this point, the swivel movement of the lever 20 again brings the sliding block 44 into a part of the coulisse 42 located further to the front (see FIG. 5), since the end of the raising rod 22 associated to the lever 20 is guided in the guide rail 14 in vertical direction. As soon as the condition shown in FIGS. 5 and 6 is reached, in which the lever 20 is maximally swiveled to the top, the carriage 16 is detached from the front end of the raising rod 22 and the same is locked in the guide rail, whereby the lever 20 is reliably locked in the position raised.

When the carriage 16 now is shifted further to the rear, it carries along the cover 10 to the rear via the guide element 18, wherein the sliding guideway 40 is shifted relative to the slider 38 which is coupled with the lever 20. When the cover 10 is maximally opened, the carriage 16 is located at a small distance before the swivel bearing 32 and the region in which the bearing block 24 is arranged. This is possible because the lever 20 now has exposed this region, which it still has assumed in the starting position, due to its swivel movement to the top.

The carriage 16 is moved to the front to again close the cover 10. As a result, it initially carries along the guide element 18 to the front, whereby the cover 10 is pulled forwards relative to the raised lever 20. Then, the carriage 16 is again coupled with the raising rod 22, so that the same is shifted to the front. As a result, the lever 20 is again swiveled downwards, so that the rear end of the cover 10 is again moved into its lowered position. In addition, the guide element 18 associated to the front end of the cover is lowered, so that the cover is flush with the vehicle roof and closes the roof opening.

In the closed position of the cover 10 it is desired for optical, but also for aerodynamic reasons that the cover and the adjoining vehicle roof are located in one plane, and that it is prevented that an approach flow edge can be formed, i.e. no step or height difference is present in the transition between cover and vehicle roof. For this purpose, the distance between cover 10 and vehicle roof, i.e. the height position of the cover 10, must be adjusted accurately.

The height adjustment is achieved by the assembly shown in FIGS. 8 and 9. The assembly comprises the lever 20, which via the first swivel bearing 32 is pivotally mounted on the vehicle and via the second swivel bearing 36 can be swiveled with the cover holder 12 of the cover 10 and thus with the cover 10.

The swivel bearing 36 is formed by a bore 45 at the lever 20 and by a bearing 46 at the cover holder 12. The bearing 46 comprises two tabs arranged parallel to each other, which have concentric openings 48.

The distance of the tabs substantially corresponds to the thickness of the lever 20, so that the lever 20 can be accommodated between the two tabs.

The diameter of the openings 48 corresponds to the diameter of the bore 45 of the lever 20, which forms a counter bearing.

Mounting the lever 20 on the cover holder 12 is effected via an eccentric 50, which among other things includes two sleeves 52. The eccentric 50 furthermore has a separate part, which subsequently will be referred to as axle 54. The axle 54 has a substantially cylindrical, central base body 56. Onto each end face of the base body 56 a bolt 58 is molded, which axially protrudes eccentrically relative to the imaginary middle axis of the base body 56.

On the end face of the eccentric 50, e.g. on the end face of at least one bolt 58, a tool engagement structure 60 in the form of a tool receptacle is provided, into which a tool can engage, in order to rotate the eccentric 50.

The sleeves 52 have a substantially circular-cylindrical basic shape, wherein the outside diameter of the sleeves 52 corresponds to the diameter of the openings 48 and the inside diameter corresponds to the diameter of the bolts 58. At the inner circumference of the sleeves 52 a groove 62 is provided, into each of which a protrusion 64 of the bolts 58 of the eccentric 50 can engage, so that the bolts 58 and the sleeves 52 can non-rotatably be connected with each other. The outer circumference of the sleeves 52 is formed smooth, so that the sleeves 52 are freely rotatable in the bearing 46.

In the connected condition, the cylindrical outer surfaces of the sleeves 52 are eccentric relative to the outer surface of the base body 56.

One end face of the sleeves 52 each has a raster 66 which is formed by a plurality of axially protruding ribs. As will be explained below, the raster serves to fix the rotary position of the sleeve 52 and of the base body 56 non-rotatably coupled with the sleeve 52.

The assembly furthermore includes a locking member 68 which here is a U-shaped metal clip. Together with the raster 66 the locking member 68 forms a locking mechanism.

In FIG. 9, the assembly is shown in the assembled condition. For assembly, the lever 20 with the bore 45 is inserted into the bearing 46 such that the bore 45 is arranged concentrically relative to the opening 48 of the bearing 46. Subsequently, the eccentric 50 is pushed into the bearing 46, until the base body 56 of the eccentric 50 is arranged in the bore 45 of the lever 20.

The diameter of the bore 45 of the lever 20 corresponds to the diameter of the opening 48 of the bearing 46, so that the base body 56 of the eccentric 50 is rotatably accommodated in the bearing 46. Subsequently, the sleeves 52 are pushed onto the bolts 58 of the eccentric 50 on both sides, wherein the raster 66 each is directed to the outside.

When the bolt 58 is rotated in the bearing 46, a displacement of the cover 10 or cover holder 12 with respect to the lever 20, i.e. a height adjustment of the cover 10, is effected, since the bolts 58 are eccentrically arranged on the base body 56.

To be able to fix the eccentric 50 in a certain position, the locking member 68 can be pushed onto the cover holder 12 in a receptacle 70, which is formed by two parallel grooves, such that the legs 72 of the locking member 68 engage in the raster 66 of the sleeves 52 and prevent a further rotation of the sleeves 52. As a result, the base body 56 non-rotatably coupled with the sleeves 52 is fixed and thus the height of the cover 10 relative to the vehicle roof or the lever 20 is defined.

Since the base body 56 of the eccentric 50 is rotatably mounted in the bore 45 of the lever 20, swiveling the lever 20 and thus adjusting the cover 10 for opening and closing the sliding roof is possible independent of the position of the eccentric 50.

The assembly according to the invention thus provides for a fast and easy, individual adaptation of the height of the cover 10. To be able to perform an adaptation of the height, it is merely necessary to shift the locking member 68 within the receptacle 70 formed as linear guide, so that the eccentric 50 again is freely rotatable. The height can be adapted by rotating the eccentric 50 and subsequently be fixed by mounting the locking member 68.

The legs 72 of the locking member 68 can, however, also be formed resilient, so that a height adjustment also can be effected without shifting the locking member 68.

The locking member 68 might also directly engage the bolt 58 of the eccentric 50.

The embodiment shown here with two sleeves 52 merely serves for an easier assembly, since the eccentric 50 thus can laterally be inserted into the bearing 46. The sleeves 52 merely serve for compensating the larger diameter of the opening 48 of the bearing 46.

It is also conceivable that the eccentric 50 includes an eccentrically arranged bolt 58 merely on one end face.

Instead of being arranged between cover 10 and lever 20, as shown here, the eccentric 50 might also be arranged between a vehicle-mounted component 74, i.e. here at the second swivel bearing 32.

Furthermore, locking the eccentric 50 might also be effected at the lever 20.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly for an openable sliding roof having a cover for selectively exposing and closing a roof opening, the assembly comprising:
    at least one lever for raising and lowering the cover, the at least one lever being pivotally mounted to the cover; and
    a height adjusting mechanism for repositioning the lever with respect to the cover, the height adjusting mechanism having an eccentric coupling the lever to the cover, the eccentric being rotatably received in a bearing and rotational movement of the eccentric repositioning the lever with respect to the cover;
    a releasable locking mechanism configured to prevent rotation of the eccentric relative to the bearing, and to lock the eccentric relative to the bearing in selected rotary positions;
    wherein the eccentric further comprises lateral receptacles or protrusions for engagement with a locking member of the releasable locking mechanism, the locking member being laterally mounted for movement between an adjusting position and a locking position.

2. The assembly according to claim 1, wherein the lateral receptacles or protrusions comprise an end-face raster provided on the eccentric.

3. The assembly according to claim 1, wherein the locking member is a U-shaped member configured to engage a pair of axially opposite end portions of the eccentric comprising said lateral receptacles or protrusions.

4. The assembly according to claim 3, wherein the eccentric includes an axle configured to be non-rotatably secured to the lever or the cover via the locking member.

5. The assembly according to claim 1, wherein the eccentric has a multi-component configuration.

6. The assembly according to claim 4, wherein the eccentric includes at least one cylindrical sleeve in which the axle is eccentrically held.

7. The assembly according to claim 6, wherein the axle is held between a pair of sleeves located on opposite axial end faces of the axle.

8. The assembly according to claim 7, wherein the eccentric further comprises a tool engagement structure for rotating the eccentric.

9. The assembly according to claim 1, wherein the eccentric includes an axle non-rotatably secured to the lever or the cover.

10. The assembly according to claim 9, wherein the eccentric includes at least one cylindrical sleeve in which the axle is eccentrically held.

11. The assembly according to claim 9, wherein the axle is held between a pair of sleeves located on opposite axial end faces of the axle.

12. The assembly according to claim 1, wherein movement of the height adjustment mechanism repositions the lever with respect to the cover and wherein movement of the height adjustment mechanism is independent of the pivotal movement of the lever with respect to the cover.

13. The assembly according to claim 1, wherein rotational movement of the eccentric is independent of the pivotal movement of the lever with respect to the cover.

14. An assembly for an openable sliding roof having a cover for selectively exposing and closing a roof opening, the assembly comprising:
    at least one lever for raising and lowering the cover, the at least one lever being pivotally mounted to the cover and a vehicle fixture; and
    a height adjusting mechanism for repositioning the lever, the height adjusting mechanism having an eccentric coupling the lever to the vehicle fixture, wherein the eccentric is rotatably received in a bearing and rotational movement of the eccentric repositions the lever with respect to the vehicle fixture, and wherein the assembly further comprises a releasable locking mechanism for preventing rotation of the eccentric relative to the bearing and wherein rotational movement of the eccentric is independent of the pivotal movement of the lever with respect to the vehicle fixture.

15. An assembly for an openable sliding roof having a cover for selectively exposing and closing a roof opening, the assembly comprising:
    at least one lever for raising and lowering the cover, the at least one lever being pivotally mounted to the cover and a vehicle fixture;
    a height adjusting mechanism for repositioning the lever, the height adjusting mechanism having an eccentric coupling the lever to the vehicle fixture, wherein movement of the height adjustment mechanism repositions the lever with respect to the vehicle fixture and wherein movement of the height adjustment mechanism is independent of the pivotal movement of the lever with respect to the vehicle fixture.

* * * * *